(12) United States Patent
Junge (10) Patent No.: US 11,098,616 B2
(45) Date of Patent: Aug. 24, 2021

(54) ASSEMBLED CAMSHAFT AND METHOD FOR PRODUCING AN ASSEMBLED CAMSHAFT

(71) Applicants: THYSSENKRUPP PRESTA TECCENTER AG, Eschen (LI); thyssenkrupp AG, Essen (DE)

(72) Inventor: Volker Junge, Wernigerode (DE)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/767,420

(22) PCT Filed: Dec. 12, 2018

(86) PCT No.: PCT/EP2018/084468
§ 371 (c)(1),
(2) Date: May 27, 2020

(87) PCT Pub. No.: WO2019/115581
PCT Pub. Date: Jun. 20, 2019

(65) Prior Publication Data
US 2020/0386123 A1 Dec. 10, 2020

(30) Foreign Application Priority Data
Dec. 13, 2017 (DE) ..................... 10 2017 222 607.2

(51) Int. Cl.
*F01L 1/047* (2006.01)
*F16H 53/02* (2006.01)

(52) U.S. Cl.
CPC ............ *F01L 1/047* (2013.01); *F16H 53/025* (2013.01); *F01L 2001/0471* (2013.01); *F01L 2303/00* (2020.05)

(58) Field of Classification Search
CPC ................... F01L 1/047; F01L 2303/00; F01L 2001/0471; F01L 2303/02; F16H 53/025; B23P 2700/02; B23P 15/00
(Continued)

(56) References Cited

U.S. PATENT DOCUMENTS 5,992,017 A * 11/1999 Grafchev ............... B21D 39/04
29/283.5
7,748,925 B2 * 7/2010 Saito ....................... F16D 1/072
403/359.5
(Continued)

FOREIGN PATENT DOCUMENTS

DE           197 10 847 A    9/1998
DE     10 2008 053 723 A    5/2010
(Continued)

OTHER PUBLICATIONS

English Translation of International Search Report issued in PCT/EP2018/084468, dated Feb. 14, 2019.

*Primary Examiner* — Patrick Hamo
*Assistant Examiner* — Wesley G Harris
(74) *Attorney, Agent, or Firm* — thyssenkrupp North America, LLC (57) ABSTRACT

A camshaft and method of producing a camshaft for an internal combustion engine. The camshaft includes a base shaft and an external toothing extending at least in certain portions axially along the base shaft. The camshaft includes a hub with an internal toothing which correlates with the external toothing of the base shaft such that the hub is connected rotationally conjointly and axially non-displaceably to the base shaft. The external toothing has at least one form-fit subregion that extends axially at least in certain portions along the base shaft, or one force-fit subregion in order for the hub to be arranged at least in a form-fitting or force-fitting manner. At least the form-fit subregion or the
(Continued)

force-fit subregion is adjoined by at least one alignment region which extends at least in certain portions axially along the base shaft and which serves for the angular alignment of the hub.

9 Claims, 4 Drawing Sheets

(58) Field of Classification Search
USPC .............................. 123/90.17, 90.6; 29/888.1
See application file for complete search history.

(56) References Cited

U.S. PATENT DOCUMENTS

| | | | |
|---|---|---|---|
| 8,662,043 B2* | 3/2014 | Dollinger | F01L 13/0042 |
| | | | 123/90.6 |
| 8,844,130 B2* | 9/2014 | Scherzinger | F16H 53/025 |
| | | | 29/888.1 |
| 2006/0064872 A1* | 3/2006 | Shirai | B21D 53/84 |
| | | | 29/888.1 |

FOREIGN PATENT DOCUMENTS

| | | | |
|---|---|---|---|
| DE | 10 2011 103 544 A | | 12/2012 |
| DE | 10 2012 109 689 A | | 4/2014 |
| JP | 11108070 A | * | 4/1999 |
| JP | 2002-258675 A | | 9/2002 |
| JP | 2003184994 A | * | 7/2003 |
| JP | 2012-021594 A | | 2/2012 |

* cited by examiner

ASSEMBLED CAMSHAFT AND METHOD FOR PRODUCING AN ASSEMBLED CAMSHAFT

CROSS REFERENCE TO RELATED APPLICATIONS

This application is a U.S. National Stage Entry of International Patent Application Serial Number PCT/EP2018/084468, filed Dec. 12, 2018, which claims priority to German Patent Application No. DE 10 2017 222 607.2, filed Dec. 13, 2017, the entire contents of both of which are incorporated herein by reference.

FIELD

The present disclosure generally relates to an assembled camshaft and to a method for producing an assembled camshaft.

BACKGROUND

An assembled camshaft for installation into an internal combustion engine is known from DE 10 2011 103 544 A1. In the case of the camshaft described therein, the base shaft has an external toothing by means of which sliding cam units are guided axially on the base shaft and are connected rotationally conjointly to the base shaft. Bearing rings fastened to the external toothing serve for the mounting and guidance of the camshaft in the internal combustion engine. The bearing elements are in particular thermally joined by means of an interference fit. It is however to be considered disadvantageous here that the bearing rings are pushed in an overlapping manner over the external toothing, and that large temperature differences act on the camshaft or on the components during the thermal joining.

Thus a need exists to eliminate the disadvantages of an assembled camshaft, in particular in the case of a method for producing an assembled camshaft. The disclosure provides a method for producing a camshaft and to provide a camshaft produced in accordance with said method, wherein no introduction of heat into the axially fixed or the axially non-displaceable hub is performed. It is furthermore sought to provide a method for producing a camshaft, in the case of which the axially non-displaceable hub is pushed over a toothing of the base shaft only over short sections.

Features and details that are described in conjunction with the camshaft also apply in conjunction with the production method and vice versa in each case, such that reference is always or can always be made reciprocally with respect to the disclosure of the individual aspects of the invention.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an assembled camshaft and to a method for producing an assembled camshaft, wherein the camshaft is formed as a sliding camshaft and has, on the base shaft, axially fixed functional elements, such as for example cams, and axially displaceable cams.

According to the invention, the assembled camshaft for an internal combustion engine comprises a base shaft with an external toothing which extends at least in certain portions axially along the base shaft, and comprises at least one hub with an internal toothing which correlates with the external toothing of the base shaft such that the hub is connected rotationally conjointly and axially non-displaceably to the base shaft, wherein the external toothing has at least one form-fit subregion or force-fit subregion, which extends axially at least in certain portions along the base shaft, in order for the hub to be arranged at least in a form-fitting or force-fitting manner. Furthermore, the form-fit subregion or the force-fit subregion is adjoined by at least one alignment region which extends at least in certain portions axially along the base shaft. Here, the external toothing at least of the form-fit subregion or of the force-fit subregion has at least two tooth spaces with at least two mutually different widths, and the internal toothing of the hub has at least one tooth which has a width correlating with one of the tooth spaces, of different widths, of the base shaft, wherein the combination of the at least one tooth of the internal toothing of the hub with the first tooth space of the external toothing of the base shaft forms a sliding fit. Here, at least the force-fit connection of the hub to the base shaft for the axial fixing of the hub exists owing to an interference-fit connection formed combination of at least that second tooth space of the base shaft which has a second width and that at least one non-correlating first tooth of the internal toothing which has a first width. Advantageously, an external toothing is formed on the base shaft, and thus a facility is created for guiding different hubs axially along the base shaft and at the same time connecting said hubs rotationally conjointly to said base shaft, as is the case for example in sliding cam systems. For the rotationally conjoint connection of the base shaft to the hub, the toothing of the base shaft provides multiple form-fit elements for forming a form-fit connection. It is advantageously the case that no form fit is formed between the base shaft and the hub, with its internal toothing, in the alignment region, whereby the hub can be rotated or turned into a desired angular position relative to the base shaft or the external toothing thereof. The alignment region advantageously extends over the entire circumference of the base shaft, but at least over a circumferential segment, in order to allow the desired angular alignment of the hub relative to the external toothing or relative to the base shaft. The alignment region may be formed for example by virtue of the external toothing being ground away or milled away. It is furthermore possible for no external toothing to be formed on the base shaft in the alignment region. It is advantageous that, in the combination of that at least one tooth of the internal toothing of the hub which has a defined width with that at least one first tooth space of the external toothing of the base shaft which has a first width, a sliding fit is formed between these. In this way, the hub can advantageously be displaced over the external toothing without damaging the external toothing. It is advantageously possible for the undamaged external toothing to be used for the rotationally conjoint connection of other components or for the purposes of axial guidance during the displacement. The combination of the at least one tooth of the internal toothing and of that tooth space of the external toothing which has a second width is advantageously utilized for the axial fixing of the hub on the base shaft, whereby the tip circle and/or the root circle of the external toothing are not damaged as the hub is pushed over.

The proportions of the respective widths of the tooth spaces or of the teeth of the base shaft with respect to one another are preferably configured as discussed below. The first tooth or tooth space is wider than the second tooth or tooth space. For example, the width at the midpoint of the tooth height may serve as a basis for the consideration. The same basis for reference applies vice versa to the internal toothing of the hub. The corresponding proportions of the further relevant tooth widths or tooth spaces correspond to the same pattern.

The hub that is to be fixed in axially non-displaceable fashion may for example be a sensor encoder wheel, a cam for actuating valves of the internal combustion engine, or a pump cam for actuating a fuel pump or a vacuum pump. It is however also conceivable for the hub to be formed as an assembled multiple-cam system. It is furthermore advantageous that the alignment region does not form a form-fit subregion or force-fit subregion for the hub with its internal toothing, in order that the hub does not form a rotationally conjoint connection to the base shaft in this region, and can be rotated or turned into its required angular position in order to then, in a corresponding angular position, form at least the force-fit connection with the base shaft for the axial fixing of the hub owing to an interference-fit connection formed between at least that second tooth space of the external toothing of the base shaft which has a second width and that tooth of the internal toothing of the hub which has a width which does not correlate with the second width of the second tooth space.

The external toothing of the base shaft may advantageously be designed for example as a multi-tooth profile, for example a spline profile or toothed hub profile with involute toothing. The external toothing may however also be formed as a polygonal profile or as a similar non-circular shape which can ensure the rotationally conjoint fixing of the hub on the base shaft for example in the form of a force fit and/or form fit for the purposes of transmitting a torque between hub and base shaft.

In the context of the invention, it is furthermore conceivable for the two tooth spaces, formed with the different widths, of the base shaft to be formed in an encircling manner in an alternating sequence. It is thus advantageously the case that a multiplicity of different tooth spaces is provided, whereby axial securing against relatively high forces is made possible. It is advantageously thus furthermore the case that the tooth spaces of different width of the external toothing are distributed uniformly over the circumference, resulting in a uniform introduction of force into the hub. The angular alignment of the hub is thus advantageously possible in a corresponding, for example fine, tooth pitch or distribution of the tooth spaces.

In a preferred and advantageous refinement of the invention, that tooth of the internal toothing of the hub which has a first width is formed multiple times over the circumference and distributed in a manner matching the first and second tooth spaces. The uniform expansion or change in shape of the hub owing to the interference-fit connection is advantageous here. However, if the hub is subject to an introduction of torque or torque loading which is non-uniform over the circumference of the base shaft, such as arises for example in the case of cams or pump cams, it is however also conceivable for the tooth spaces with their different widths to be distributed non-uniformly over the circumference, and then for example in a manner adapted to the acting torque profile. It is thus advantageously possible to optimize the axial fixing of the hub on the base shaft, and the interference-fit connection between base shaft and hub can better withstand the fluctuating loads.

In a further preferred configuration of the invention, the internal toothing of the hub has a second tooth with a second width, wherein the second tooth can form a sliding fit in each case with the first tooth space and the second tooth space of the base shaft, and the first and second teeth are formed in an encircling manner in an alternating sequence. It is advantageously possible in this way for the form-fit subregion which acts between the base shaft and the hub, and thus the effective form fit and thus the transmissible torque, to be increased. This is particularly advantageous for torque-transmitting hubs, such as for example pump cams or cams for valves.

In one advantageous configuration, the form-fit subregion and/or the force-fit subregion are divided by the alignment region into at least two axially spaced-apart form-fit subregions and/or force-fit subregions. It is advantageously possible, by means of this arrangement or sequence of the regions and corresponding combination of the teeth and of the correlating tooth spaces, for the hub to be pushed over regions of the external toothing without forming an interference-fit connection and damaging the toothing. It is only in the immediate vicinity of the end position, after the angular alignment of the hub in the alignment region, that the interference-fit connection is formed between the base shaft and the hub. The hub therefore only needs to be pushed over a short region of the external toothing. The forces for the assembly process, and the displacement travel, can consequently be reduced, and the risk of damage to the external toothing can be minimized.

In one advantageous refinement of the invention, multiple form-fit subregions and/or force-fit subregions and multiple alignment regions extend in an alternating manner at least in certain portions in an axial direction along the base shaft. An alignment region is thus advantageously closer to the end position of the hub, and the displacement travel of the hub over the toothing with an interference fit formed between the base shaft and the hub can be reduced.

In the case of another preferred configuration of the invention, the internal toothing of the hub is divided with its axial extent into at least two subregions. With corresponding configuration or dimensioning of the axial extent of the hub with its internal toothing and of the alignment regions, the toothing of the hub can be pushed into the at least two alignment regions. The internal toothing of the hub is accordingly advantageously distributed over multiple axially spaced-apart subregions. It is advantageously thus possible for the individual alignment regions to be formed so as to be axially shorter than a single alignment region that is intended to receive the corresponding internal toothing of the hub during a turning process or during the angular alignment. In this way, the external toothing which, for other hubs, is utilized for the rotationally conjoint fixing and for the axial guidance on the base shaft merely needs to be broken up into smaller parts in these regions, whereby the transmissible torque is increased, or the force distribution during a transmission of torque between shaft and hub is distributed.

In the method according to the invention for producing an assembled camshaft, a base shaft is provided, in the case of which the surface is machined such that, in at least one subregion, an external toothing is formed which extends at least in certain portions axially along the base shaft, which external toothing provides at least one form-fit subregion or one force-fit subregion for the at least one hub with its internal toothing in order to ensure the connection to the base shaft. Furthermore, the external toothing is formed so as to have multiple teeth with at least two tooth spaces, and the at least two tooth spaces have two mutually different widths. Furthermore, in the method according to the invention, an alignment region is formed on the base shaft, which alignment region axially adjoins the form-fit subregion and/or the force-fit subregion and does not form a form-fit subregion and/or force-fit subregion for the hub with its internal toothing. Furthermore, a hub with an internal toothing running in an axial direction is provided, which internal toothing correlates with the external toothing of the base shaft, and the internal toothing has at least one tooth with a defined width. During the installation of the hub, the hub is threaded in an angularly aligned manner onto the external toothing of the base shaft, and the correlating external toothing of the base shaft, with its first tooth space and the internal toothing of the hub, together with the at least one tooth of the first width form a sliding fit. For this purpose, the width of the first tooth space of the external toothing is dimensioned to be larger than that tooth of the internal toothing which has a first width.

The hub is displaced axially along the form-fit subregion of the base shaft until the internal toothing of the hub has been pushed into the alignment region. Subsequently, angularly precise alignment of the hub relative to the external toothing of the base shaft is performed such that at least one diameter pairing or combination of the second tooth space, or of that tooth space which has a second width, of the external toothing and that tooth of the internal toothing which has a first width is formed, and these are in axial alignment. Subsequently, an axial displacement of the hub along the external toothing of the base shaft and thus along the form-fit subregion or the force-fit subregion of the base shaft as far as the end position thereof is performed, wherein, owing to the overlap that exists between the second tooth space of the external toothing of the base shaft and that tooth of the internal toothing of the hub which has a first width (wherein it may also be the case that multiple second tooth spaces have a second width and multiple teeth of the external toothing have a first width), an interference-fit connection is formed between the base shaft and the hub, and the hub is fixed against axial displacement. This means that, for this purpose, the width of the second tooth space of the external toothing is dimensioned to be smaller than that tooth of the internal toothing which has a first width. Owing to the interference-fit connection between the base shaft and the hub, these form a force-fit subregion which performs the axial fixing of the hub on the base shaft, wherein the form-fit subregion is provided for the rotationally conjoint fixing. The force-fit subregion encompasses at least the axial length of that internal toothing of the hub which is involved in the interference-fit connection. The force-fit subregion extends along the base shaft at least so as to encompass the length of the internal toothing of the hub and the end position thereof on the base shaft. It is however also conceivable for the force-fit subregion to designed so as to furthermore encompass the displacement travel of the hub.

All of the advantages that have already been described with regard to an assembled camshaft according to the first aspect of the invention arise in the case of described method.

In a preferred configuration of the method according to the invention, the alignment region is arranged such that the form-fit subregion and/or the force-fit subregion are/is divided by the alignment region into at least two axially spaced-apart form-fit subregions and/or force-fit subregions. It is advantageously thus possible for the displacement travel, that is to say the travel along which the hub is pushed over the external toothing with the formation of an interference fit or overlap, to be shortened. The risk of damage to the external toothing is thus reduced.

In a further preferred configuration of the invention, the alignment region is formed by cutouts in the external toothing, for example by milling or grinding. It is for example advantageously possible for a continuous external toothing to be formed, which is then interrupted, and divided into different form-fit subregions or force-fit subregions, by means of at least one retroactively introduced or formed alignment region. In this way, it is for example possible to utilize rolling for the purposes of forming the toothing. Furthermore, the external toothing may advantageously be optionally removed, such that it no longer forms a form-fit subregion and/or force-fit subregion for the internal toothing of the hub, over the entire circumference of the base shaft or only in a circumferential partial region. The external toothing may, in the other regions, be maintained and utilized for a rotationally conjoint connection or for axial guidance of the or of other, further hubs with or on the base shaft. Alternatively, it is however also conceivable for the external toothing to be formed by means of cold drawing or form drawing and the like, wherein the alignment region is in this case formed preferably directly during the generation of the external toothing. Reworking by means of grinding or milling may however also be performed. It is advantageously the case that no form fit is formed between the base shaft and the hub, with its internal toothing, in the alignment region, whereby the hub can be rotated or turned into a desired angular position relative to the base shaft or the external toothing thereof.

In a further preferred configuration of the invention, that tooth of the internal toothing of the hub which has the first width is formed multiple times over the circumference and distributed in a manner matching the tooth spaces. It is advantageously thus possible for the interference-fit connection between hub and base shaft to be improved, and for improved securing against axial displacement for relatively high forces to be achieved.

Figure 1:
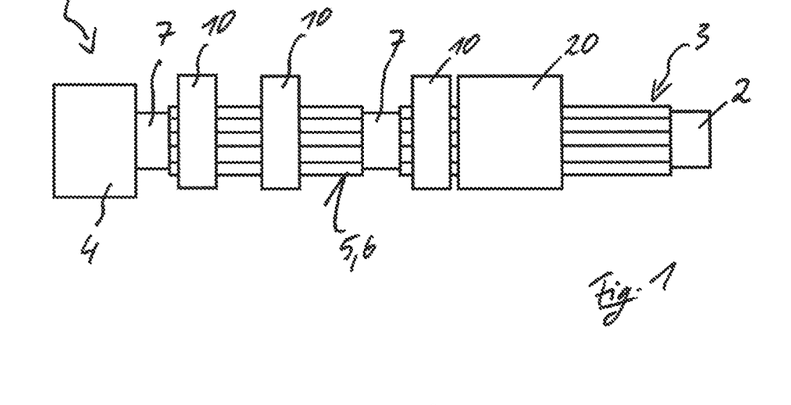
FIG. 1 is a side view of an embodiment of an assembled camshaft.

FIG. 1 schematically shows an embodiment of an assembled camshaft 1 according to the invention for an internal combustion engine which is constructed in accordance with the principle of a camshaft with sliding cam elements. The assembled camshaft 1 comprises at least a base shaft 2, with an external toothing 3, and at least one hub 10 connected rotationally conjointly and non-displaceably to the base shaft. The base shaft 2 is preferably of rod-shaped form and may be formed as a hollow shaft or solid shaft. The hub 10 may for example be a sensor wheel or a cam, such as for example a pump cam or a cam for valve actuation. At one end, the base shaft 2 has an end piece 4, to which, for example, a toothed wheel (not shown here) for the drive of the camshaft 1 can be attached. The end piece 4 may be formed integrally with the base shaft 2 or may be manufactured separately and retroactively installed. It is furthermore conceivable for no end piece 4 to be formed on the base shaft 2, but rather for a diameter enlargement or the like to be provided. All variants have in common the fact that the components can be mounted advantageously only from one side of the camshaft 1.

Figure 3:
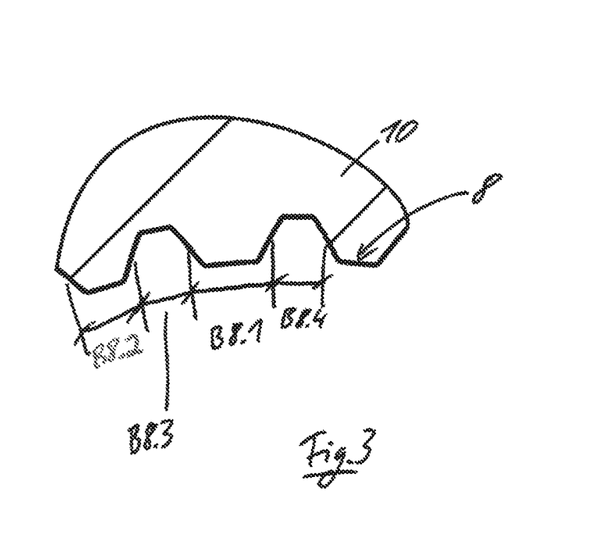
FIG. 3 is an enlarged detailed view of a cross section of a configuration of a hub, which has an internal toothing, of an assembled camshaft.

As is also illustrated in FIG. 1, the assembled camshaft 1 may have multiple rotationally conjoint and axially non-displaceable hubs 10. The external toothing 3 of the base shaft 2 is formed for example by a multi-tooth profile in the form of an involute toothing. The multi-tooth profile of the external toothing 3 may also be formed as a polygon or similar non-circular shape. It is essential here that the non-circular shape can rotationally conjointly fix the hub 10 and transmit the torque for transmission from the base shaft 2 to the hub 10 and withstand said torque. The external toothing 3 may be formed on the rod-shaped base shaft 2 for example by means of a rolling, milling and/or drawing process. The external toothing 3 forms a form-fit subregion 5 and/or a force-fit subregion 6 for the hub 10. The form-fit subregion 5 serves for example for the axial guidance of the hub 10 during the installation process. The hub 10 is fixed in an axially non-displaceable manner to the base shaft 2 by means of interference fit described in more detail further below. A rotationally conjoint connection between base shaft 2 and hub 10 may be realized by means of the form-fit subregions 5 of the camshaft 1. Provision is made for mutual support or supplementation of form-fit subregion 5 and force-fit subregion 6 for the purposes of fixing the hub 10 on the base shaft 2 in an end position. The force-fit subregion 6 of the base shaft 2 is formed by means of the interference-fit connection between base shaft 2 and hub 10. The force-fit subregion 6 extends along the base shaft 2 at least so as to encompass the length of the internal toothing 8 (as shown in FIG. 3) of the hub 10 and the end position thereof on the base shaft 2. It is however also conceivable for the force-fit subregion 6 to furthermore encompass the displacement travel of the hub 10. It is therefore conceivable for both subregions, specifically a form-fit subregion 5 and a force-fit subregion 6, to be formed axially spaced apart from one another on the base shaft 2 such that both subregions extend at least in certain portions axially along the base shaft 2. It is advantageous if both subregions extend all the way around the base shaft 2 in a circumferential direction, that is to say the form-fit connection and the force-fit connection between base shaft 2 and hub 10 are formed so as to be distributed over the circumference. In the configuration shown in FIG. 1, the external toothing 3 is divided axially into two subregions, and thus into two form-fit subregions 5 or two force-fit subregions 6. Between the two subregions and between the end piece 4 and one of the two subregions, in particular the second subregion of the external toothing 3, there is formed in each case one alignment region 7.

If the external toothing 3 is formed for example by rolling of the rod-shaped base shaft 2, the alignment region 7 can be formed by retroactive grinding or milling of said external toothing 3. It is however also possible for the external toothing 3 to be formed only in certain portions over the axial length on the base shaft, whereby the alignment regions 7 may also already be formed, in particular by virtue of machining of the surface of the base shaft 2 not being performed in regions between the machined portions. For example, during a drawing process in which a rod-shaped basic body is pulled or pushed through a die, the form of the alignment regions 7 and of the subregions, in particular of the form-fit subregions 5 and/or of the force-fit subregions 6, of the external toothing 3 may thus be provided in a manner dependent on the axial arrangement thereof on the base shaft 2. Then, retroactive machining of the base shaft 2 or of the external toothing 3 for the purposes of forming the one or more alignment regions 7 is preferably not necessary.

Furthermore, the assembled camshaft 1 has a further, in particular axially displaceable, hub 20. In the case of the camshaft 1 being used in an internal combustion engine, the hub 20 is displaceable axially along the external toothing, in particular along the subregions formed, such as the force-fit subregion 6 and/or the form-fit subregion 5. The further hub 20 accordingly constitutes a sliding cam element, as is already well known from the general prior art. The external toothing 3 of the base shaft 2 forms a form-fit subregion 5 for the hub 20. The hub 20 is guided axially along the base shaft 2, and connected rotationally conjointly thereto, by means of the form-fit subregion 5.

Figure 2:
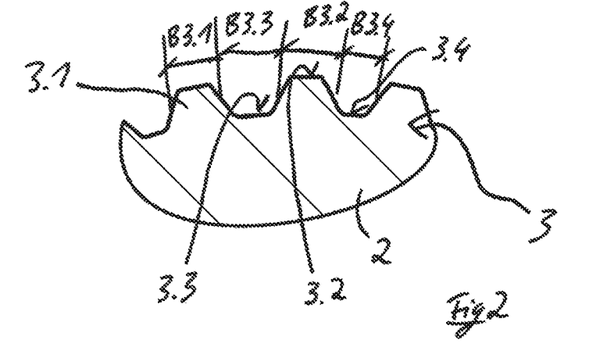
FIG. 2 is an enlarged detailed view of a cross section of a configuration of a base shaft, which has an external toothing, of an assembled camshaft.

FIG. 2 shows an enlarged detail of a cross section of a base shaft 2 of an embodiment of an assembled camshaft according to the invention. The external toothing 3, designed for example as an involute toothing, in particular whose teeth 3.1, 3.2 each have a width B3.1, B3.2, while the tooth spaces 3.3, 3.4 thereof each have a width B3.3, B3.4. FIG. 2 shows, by way of example, in each case one first tooth 3.1 and one second tooth 3.2 with tooth spaces 3.3 and 3.4 respectively formed adjacent thereto in a circumferential direction of the base shaft. Here, the first tooth space 3.3 is wider than the second tooth space 3.4. The two teeth 3.1, 3.2 have, for example, the same width. A further first or a further second tooth may be formed adjacent to one of the two tooth spaces 3.3, 3.4 (in this case clockwise adjacent to the tooth space 3.4). It is however also conceivable for a further tooth with a further tooth width, in particular a third tooth with a second tooth width, to be formed. Depending on the configuration, the number and distribution of the different teeth 3.1, 3.2 and of the different tooth spaces 3.3, 3.4 may vary. Preferably, the first 3.1 and the second teeth 3.2 and the first 3.3 and the second tooth spaces 3.4 are formed so as to be distributed uniformly and in an alternating manner over the circumference of the base shaft 2.

FIG. 3 shows an enlarged detail of a cross section through a hub 10 of an embodiment of an assembled camshaft 1 according to the invention. The hub 10 has an internal toothing 8 which extends in an axial direction. In the embodiment shown in FIG. 3, the internal toothing 8 has first teeth 8.1 and second teeth 8.2 with in each case two mutually different widths, specifically a first width 8.1 and a second width 8.2. In a circumferential direction of the hub opening shown, the first teeth 8.1 and the second teeth 8.2 are adjoined in each case by a first tooth intermediate region 8.3 and a second tooth intermediate region 8.4. In the configuration shown here, the first tooth 8.1 is formed so as to be wider than the second tooth 8.2 of the internal toothing 8. As already discussed with regard to the external toothing 3 as per FIG. 2, the number and the distribution of the first 8.1 and of the second teeth 8.2 and of the first 8.3 and of the second tooth spaces 8.4 may be varied depending on the configuration. Preferably, the different teeth 8.1, 8.2 and the different tooth spaces 8.3, 8.4 are distributed in a uniformly alternating manner over the circumference of the internal toothing 8 of the hub 10.

The dimensions of the internal toothing 8 of the hub 10 are selected such that the first tooth 8.1 or the first teeth 8.1 form a sliding fit with the first tooth space 3.3 or the first tooth spaces 3.3 of the external toothing 3 of the base shaft 2. The combination of one or more first teeth 8.1 of the internal toothing 8 with one or more second tooth spaces 3.4 of the external toothing 3 results in an overlap and thus a force fit or an interference-fit connection between the base shaft 2 and the hub 10.

Figure 4:
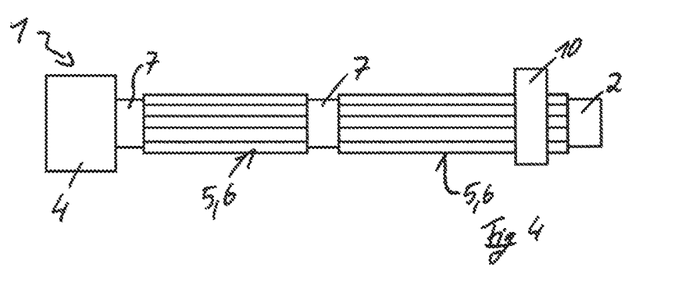
FIG. 4 is a method step during the execution of an embodiment of the method.
Figure 6:
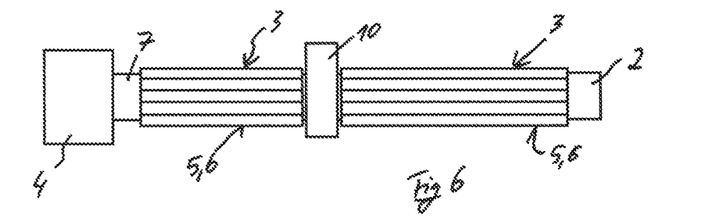
FIG. 6 is a further method step during the execution of an embodiment of the method.
Figure 9:
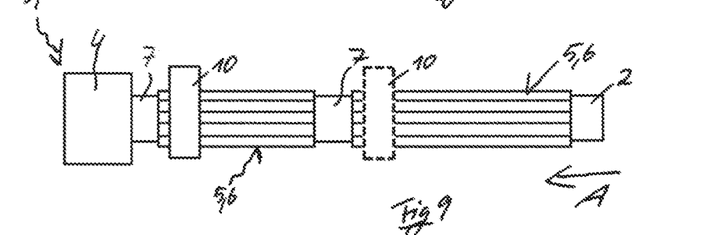
FIG. 9 is a further method step during the execution of an embodiment of the method.

FIGS. 4, 6 and 9 show different stages, in particular method steps, of the method according to the invention during the production of an assembled camshaft 1 according to the invention. FIG. 4 thus shows the base shaft 2 with an end piece 4. The external toothing 3 has already been formed on the base shaft 2. The external toothing 3 is divided by an alignment region 7 into two subregions, or an alignment region 7 is formed between two subregions of the external toothing 3. An alignment region 7 is likewise formed between the end piece 4 and the external toothing. During a process of installation of a hub 10, the hub 10, which is to be arranged in an axially non-displaceable manner on the basis shaft 2, is pushed in a threading direction A onto a first subregion of the external toothing 3 and thus onto the first form-fit subregion 5 of the base shaft 2. In order to enable the hub 10 to be pushed on, the hub 10 must be angularly aligned relative to the base shaft 2. Here, the hub 10 is aligned relative to the external toothing 3 of the base shaft 2 such that that first tooth 8.1 of the internal toothing 8 of the hub 10 which has a first width B8.1 is aligned with that first tooth space 3.3 of the external toothing 3 of the base shaft 2 which has a defined width B3.3. Those second teeth 8.2 (cf. FIG. 3) of the internal toothing 8 of the hub 10 which have a second width B8.2 are set in alignment with that second tooth space 3.4 (cf. FIG. 2) of the external toothing 3 of the base shaft 2 which has a defined width B3.4. The first width B8.1 of the tooth 8.1 and the first tooth space 3.3 with its width B3.3 are formed so as to correlate with one another. Likewise, the width B8.2 of the second tooth 8.2 correlates with the width B3.4 of the second tooth space 3.4. By means of a relative movement between the base shaft 2 and the hub 10, the hub 10 is threaded onto the base shaft 2.

Figure 5:
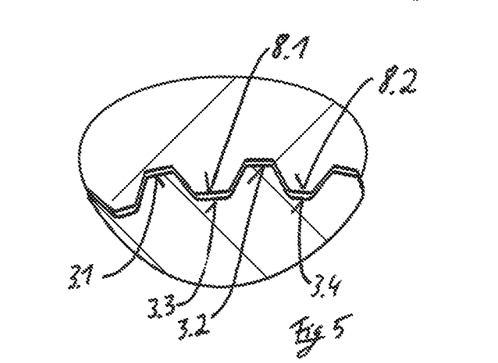
FIG. 5 is an enlarged detailed view of a cross section of the base shaft and of the hub of an embodiment of an assembled camshaft in the assembly step shown in FIG. 4.

During the displacement of the hub 10 along the first form-fit subregion 5, as shown in FIG. 4, the respective pairing of a tooth with the respective correlating tooth space sets a sliding fit. This situation is shown in FIG. 5.

FIG. 6 shows a further method step during the production of an embodiment of an assembled camshaft 1 according to the invention. Here, the hub 10 has been displaced axially to such an extent that its internal toothing 8 (see FIG. 3) is received in the alignment region 7. The form-fit subregion 5 does not act on the hub 10 here, whereby, in this situation, the hub 10 can be varied in terms of its angular alignment, that is to say rotated relative to the base shaft.

Figure 7:
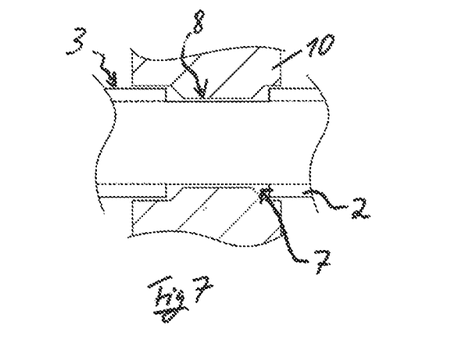
FIG. 7 is an enlarged detailed view of a longitudinal section through the base shaft and the hub of an embodiment of an assembled camshaft during the execution of the method step of the method as shown in FIG. 4.

This state as per FIG. 6 is illustrated in a longitudinal section in FIG. 7. The internal toothing 8 of the hub 10 is arranged in the alignment region 7. In the configuration shown, the internal toothing 8 of the hub 10 does not extend over the entire length of the hub 10. The alignment region 7 is dimensioned such that it can receive the internal toothing 8 of the hub 10 and can permit the rotation of the hub 10.

Figure 8:
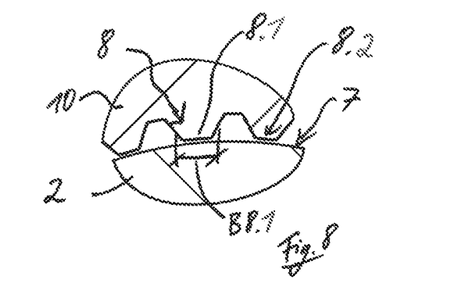
FIG. 8 is an enlarged detailed view of a cross section through the base shaft and the hub of an embodiment of a camshaft during the execution of the further method step of the method as shown in FIG. 6.

Likewise, the state illustrated in FIG. 6 is shown in FIG. 8, in particular in a cross section through the base shaft 2 and the hub 10 during the positioning of the hub 10 in the alignment region 7. It can be seen that the internal toothing 8 of the hub 10, in particular the teeth 8.1, 8.2 of the internal toothing 8 of the hub 10, may have different widths B8.1, B8.2. The teeth 8.1, 8.2 of the internal toothing 8 do not have a form-fit and/or force-fit connection with the base shaft 2. The hub 10 can be rotated and angularly aligned relative to the base shaft 2.

FIG. 9 illustrates a further method step. After the angular alignment of the hub 10 and the setting of the toothing pairing between hub 10 and base shaft 2 such that the overlap between hub 10 and base shaft 2 is set, the hub 10 is pushed along the form-fit subregion 5 or force-fit subregion 6 into its end position. During the displacement of the hub 10 along the toothing 3 with an overlap set or interference-fit connection formed, the toothing 3 forms the force-fit subregion 6. Proceeding from the situation in FIG. 6, the hub can be displaced in the threading direction A or counter to the threading direction A, as is also indicated by means of the hub 10 illustrated by dashed lines in FIG. 9. If it is the intention for the hub 10 to assume the end position corresponding to the left-hand position (not shown by dashed lines) in FIG. 9 (displacement of the hub 10 in the threading direction A), a displacement of the hub 10 as far as the alignment region 7 adjoining the end piece 4 is also possible. The angular alignment of the hub 10 would then take place there. It would subsequently be possible for the hub 10 to be displaced into the end position (in particular counter to the threading direction A). It is however also possible by means of corresponding angular rotation of the hub 10 in the alignment region 7 between the two form-fit subregions 5 or the two force-fit subregions 6, and by means of a subsequent displacement of the hub 10 in the threading direction A, for said hub 10 to be moved into its end position, in particular onto a subregion of the toothing 3.

Figure 10:
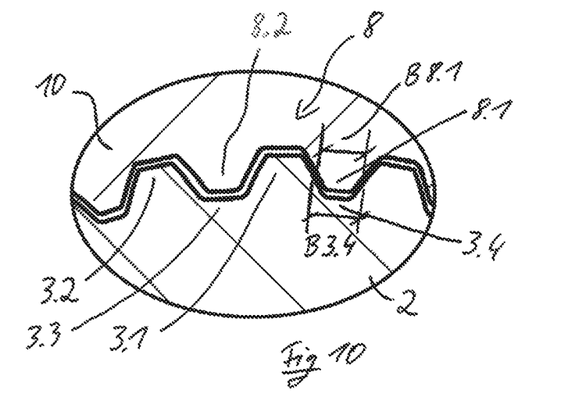
FIG. 10 is an enlarged detailed view of a cross section through the base shaft and the hub of an embodiment of an assembled camshaft during the execution of the further method step of the method as shown in FIG. 9.

The situation as per FIG. 9, in which the hub 10 has been moved into the end position, is also illustrated in an enlarged detail as a cross section in FIG. 10. Those first teeth 8.1 of the internal toothing 8 of the hub 10 which have a first width B8.1 are brought into engagement with those second tooth spaces 3.4 of the external toothing 3 of the base shaft 2 which have a second width B3.4. The non-inter-correlating tooth widths are thus combined with the tooth spaces. Thus, an interference-fit connection or overlap is formed between the base shaft 2 and the hub 10. Accordingly, those second teeth 8.2 of the internal toothing 8 of the hub 10 which have a second width B8.2 are brought into engagement with those first tooth spaces 3.3 of the external toothing 3 of the base shaft 2 which have a first width B3.3. The first teeth 8.1 of the internal toothing 8 of the hub are advantageously wider than the second teeth 8.2, wherein the first tooth spaces 3.3 of the external toothing 3 of the base shaft 2 are wider than the second tooth spaces 3.4. It is also conceivable for the teeth 8.1 and 8.2 of the internal toothing 8 of the hub 10 to have an identical width. The first teeth 8.1 of the internal toothing 8 of the hub are advantageously narrower than the first tooth spaces 3.3 but wider than the second tooth spaces 3.4 of the external toothing 3 of the base shaft 2.

Figure 11:
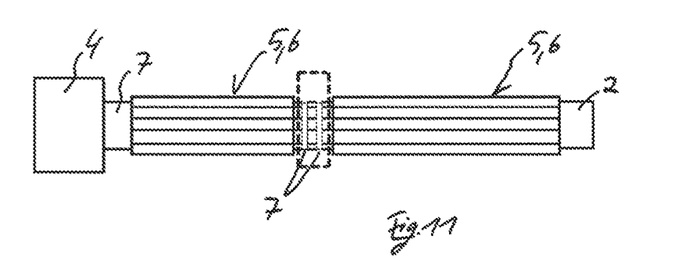
FIG. 11 is a further method step during the execution of an embodiment of the method.
Figure 12:
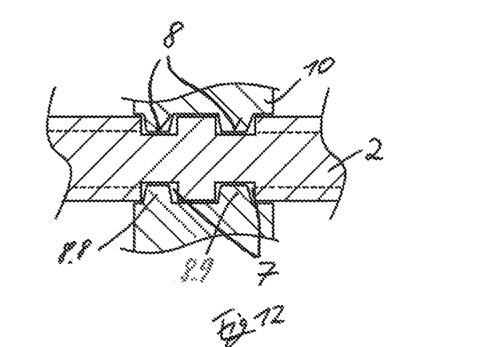
FIG. 12 is an enlarged detailed view of a cross section through the base shaft and the hub of an embodiment of an assembled camshaft during the execution of the further method step of the method as shown in FIG. 11.

FIG. 11 shows a configuration in which multiple form-fit subregions 5 and/or force-fit subregions 6, and in each case one alignment region 7 between these, are formed. The alignment regions 7 and the form-fit subregions 5 and/or force-fit subregions 6 alternate with one another along the base shaft 2 as viewed in an axial direction. The hub 10 illustrated by dashed lines is situated in a position in which it can be angularly aligned. This state is likewise shown in FIG. 12, which shows an enlarged detail of hub 10 and base shaft 2 in longitudinal section. The corresponding arrangement of the internal toothing 8 in the alignment regions 7 is hereby illustrated. In this refinement, the internal toothing 8 of the hub 10 is axially divided, specifically into two portions 8.8 and 8.9. In principle, it is also conceivable for the internal toothing 8 of the hub 10 to be divided axially into more than two portions 8.8, 8.9, in particular three or more portions. It advantageously arises from this that the form-fit subregions 5 and/or the force-fit subregions 6 of the base shaft 2 are broken up into axially shorter portions, as shown in FIG. 12. In this way, it is however also possible for the alignment regions 7 to be relocated into axial regions of the base shaft 2 in which they have no effect, or a lesser effect, for other hubs of the camshaft 1. It is thus possible for the form-fit subregions 5 to constitute, for example, interruptions of relatively small axial extent for the external toothing 3 of the base shaft 2, whereby the external toothing 3 can be better utilized for other hubs and the torque transmission or axial guidance thereof.

Figure 13:
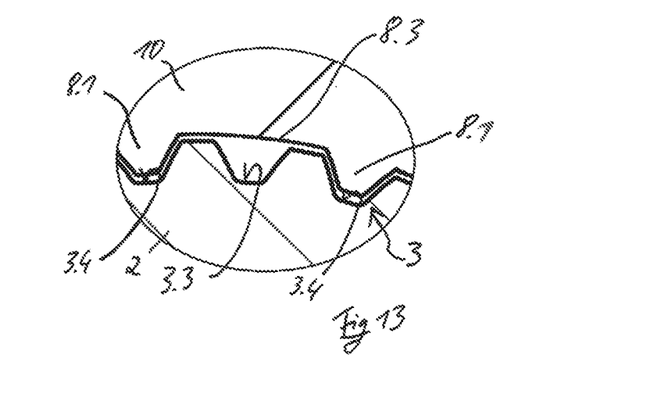
FIG. 13 is an enlarged detailed view of a cross section of a base shaft and of a hub of a further embodiment of an assembled camshaft.

A further embodiment of an assembled camshaft 1 according to the invention is illustrated in cross section as an enlarged detail in FIG. 13. The hub 10 has an internal toothing 8 with first teeth 8.1 and first tooth spaces 8.3. On the base shaft 2, there is formed an external toothing 3 with first teeth 3.1 and first 3.3 and second tooth spaces 3.4. The internal toothing 8 of the hub 10 has, in a manner adapted to the base shaft 2 or the external toothing 3 thereof, a halved number of teeth. The first teeth 8.1 and the first 3.3 and second tooth spaces 3.4 are dimensioned such that, in the combination of the first teeth 8.1 and of the first tooth spaces 3.3, a sliding fit is formed between these. A combination or pairing of the first teeth 8.1 with the second tooth spaces 8.4 gives rise to the formation of an interference fit assembly at the respective toothing flanks. An advantage of this configuration is that the angular alignment of the hub 10 can be performed in smaller steps or angular steps, which in this case correspond for example to half of the number of teeth of the hub 10. Depending on the desired angular steps that can be set, the ratio of the number of teeth to the tooth spaces can be varied. At the same time, the outlay for forming a complex and fine internal toothing 8 of the hub 10 can be reduced.

On the basis of the tooth pitch illustrated in FIG. 13, it is sought to illustrate that the first 3.3 and second tooth spaces 3.4 of the external toothing 3 of the base shaft 2 are not imperatively linked to the formation or to the presence of first 3.1 and second teeth 3.2 of the external toothing 3 of the base shaft 2. Furthermore, variations in the distribution over the circumference of the base shaft 2 or receiving opening of the hub 10 are also possible. In the configuration illustrated in FIG. 13, the internal toothing 8 of the hub 10 has fewer first 8.1 or second teeth 8.2 than the external toothing 3 of the base shaft has first 3.3 or second tooth spaces 3.4. It is thus possible for multiple teeth to engage into one tooth space of the external toothing 3 of the base shaft, and the hub 10 can, in its angular alignment, be fixed on the base shaft 2 having been angularly aligned in smaller steps.

Furthermore, the tooth width or the width of the internal and/or external toothing can be correspondingly varied.

In the context of the invention, an equivalent configuration of the above-stated combination of tooth and tooth space is also conceivable in which the ratios discussed above for base shaft 2 and hub 10 are applied conversely to the respective other component.

Figure 14:
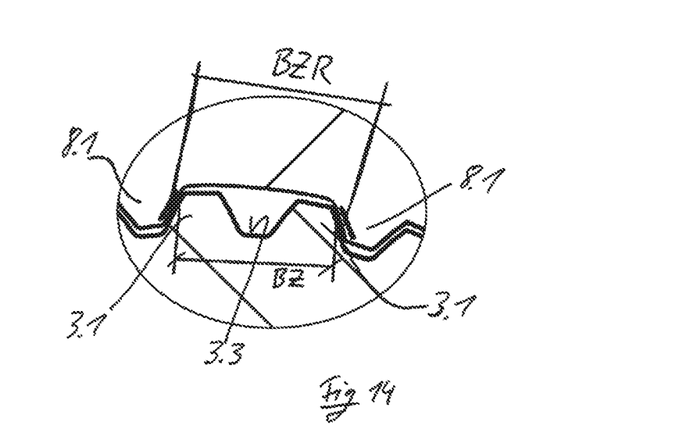
FIG. 14 is an enlarged detailed view of a cross section of a base shaft and of a hub of a further embodiment of an assembled camshaft.

It is furthermore conceivable for a tooth width BZ which is utilized for forming an interference-fit connection between hub 10 and base shaft 2, as shown in FIG. 14, to be distributed across multiple teeth 3.1. Thus, the effective tooth width BZ is for example distributed across two first teeth 3.1 which are formed adjacently to one another on the internal toothing 8 of the hub 10. Those tooth flanks which are involved in the interference fit assembly are, as shown for example in FIG. 14, those tooth flanks of the teeth 8.1 of the internal toothing 8 which face toward one another and those tooth flanks of the teeth 3.1 of the external toothing 3 which are averted from one another. The corresponding regions of the tooth flanks are highlighted in FIG. 14. The tooth width which is effective for the interference-fit connection shown in FIG. 14 is accordingly formed on the circumferential portion by means of two teeth 3.1 and one tooth space 3.3 of the external toothing 3. A corresponding tooth space of the hub 10 for the interference-fit connection of hub 10 and base shaft 2 would for example have the width BZR. The clearance fit required during the installation process is to be generated by means of the combination of the teeth 8.1 with the tooth spaces 3.3. As shown by the configuration in FIG. 14, it is thus the case that, irrespective of the tooth width of a single tooth, other angular steps are available for the angular alignment. Furthermore, the configuration shown in FIG. 14 stands as an example of the reversal of the means involved in the interference-fit connection between tooth and tooth space. Accordingly, the tooth used here for the interference-fit connection is provided or formed by the external toothing 3, and the tooth space is provided or formed by the hub 10.

In a further preferred configuration according to the invention, the internal toothing of the hub has a smaller number of teeth than the external toothing of the base shaft has tooth intermediate regions. It is advantageously possible for multiple teeth to engage into one tooth space of the external toothing of the base shaft, and the hub can, in its angular alignment, be fixed on the base shaft having been angularly aligned in smaller steps.

LIST OF REFERENCE DESIGNATIONS

1 Camshaft
2 Base shaft
3 External toothing 3.1 First tooth of the external toothing
3.2 Second tooth of the external toothing
3.3 First tooth space of the external toothing
3.4 Second tooth space of the external toothing
4 End piece
5 Form-fit subregion
6 Force-fit subregion
7 Alignment region
8 Internal toothing of the hub
8.1 First tooth of the internal toothing
8.2 Second tooth of the internal toothing
8.3 First tooth space of the internal toothing
8.4 Second tooth space of the internal toothing
8.8 Portion of the internal toothing
8.9 Portion of the internal toothing
10 First hub
20 Second hub
A Threading direction
BZ Effective tooth width of a configuration
BZR Effective tooth space of a configuration

What is claimed is:

1. An assembled camshaft for an internal combustion engine, wherein the assembled camshaft comprises:
   a base shaft including an external toothing that extends at least in certain portions axially along the base shaft, and
   a hub with an internal toothing which is sized and shaped to fit with the external toothing of the base shaft such that the hub is connected rotationally conjointly and axially non-displaceably to the base shaft,
   wherein the external toothing has at least one form-fit subregion, which extends axially at least in certain portions along the base shaft or one force-fit subregion in order for the hub to be arranged at least in a form-fitting or force-fitting manner, and
   wherein at least the form-fit subregion or the force-fit subregion is adjoined by at least one alignment region which extends at least in certain portions axially along the base shaft and which permits angular alignment of the hub,
   wherein the external toothing at least of the form-fit subregion or of the force-fit subregion comprises two tooth spaces which are formed between teeth and which have mutually different widths,
   wherein the internal toothing of the hub comprises a first tooth having a first tooth width that fits with a first of the two tooth spaces to form a sliding fit with the first tooth space, and
   wherein at least the force-fit connection of the hub to the base shaft for axial fixing of the hub is a function of an interference-fit connection formed between the first tooth and a second of the two tooth spaces of the external toothing of the base shaft, said second of the two tooth spaces having a second width,
   wherein a plurality of the first and second tooth spaces are formed in an encircling manner in an alternating sequence,
   wherein the internal toothing of the hub has at least one second tooth with a second width, and wherein the second tooth forms a sliding fit in both the first tooth space and the second tooth space of the base shaft, wherein a plurality of the first and second teeth are formed in an encircling manner in an alternating sequence.

2. The assembled camshaft of claim 1 wherein the first tooth of the internal toothing of the hub is formed multiple times over a circumference of the hub and distributed in a manner matching the first and second tooth spaces.

3. The assembled camshaft of claim 1 wherein the form-fit subregion and/or the force-fit subregion are/is divided by the alignment region into at least two axially spaced-apart form-fit subregions and/or force-fit subregions.

4. The assembled camshaft of claim 1 wherein multiple form-fit subregions and/or force-fit subregions and multiple alignment regions extend alternatingly in an axial direction along the base shaft.

5. The assembled camshaft of claim 1 wherein the internal toothing of the hub is divided with its axial extent into at least two subregions.

6. A method for producing a camshaft, comprising:
   providing a base shaft,
   machining the base shaft in at least one subregion in order to generate an external toothing which extends at least in certain portions axially along the base shaft, said external toothing providing at least a form-fit subregion or a force-fit subregion for a hub to connect to the base shaft,
   wherein the external toothing has at least two teeth which define two tooth spaces of different width, and
   forming an alignment region on the base shaft, wherein the alignment region axially adjoins at least the form-fit subregion or the force-fit subregion,
   providing the hub with an internal toothing running at least in certain portions in an axial direction, said internal toothing correlating with the external toothing of the base shaft and including at least one first tooth with a first tooth width and a second tooth with a second tooth width, wherein a first tooth space of the two tooth spaces is formed so as to be wider than a second tooth space of the two tooth spaces,
   installing the hub, wherein the hub is threaded in an angularly aligned manner onto the external toothing of the base shaft such that the external toothing of the base shaft and the internal toothing of the hub form a sliding fit,
   axially displacing the hub at least along the form-fit subregion or the force-fit subregion of the base shaft until the internal toothing of the hub has been pushed into the alignment region,
   angularly precisely aligning the hub relative to the external toothing of the base shaft such that at least one pairing composed of the second tooth space of the external toothing and the first tooth of the internal toothing is in axial alignment and such that at least one pairing composed of the second tooth of the internal toothing and the first tooth space of the external toothing is in axial alignment, with the second tooth forming a sliding fit with the first tooth space, and
   axially displacing the hub at least along the form-fit subregion or the force-fit subregion of the base shaft as far as an end position thereof, wherein, due to a fit between the second tooth space of the external toothing of the base shaft and the first tooth of the internal toothing of the hub, an interference-fit connection is formed between the base shaft and the hub, whereby the hub is fixed against axial displacement.

7. The method of claim 6 wherein at least the form-fit subregion or the force-fit subregion is divided by the alignment region into at least two axially spaced-apart form-fit subregions or force-fit subregions.

8. The method of claim 6 wherein the alignment region is formed by cutouts in the external toothing.

9. The method of claim 6 wherein the first tooth is formed multiple times over a circumference of the hub and distributed to match spacing of the tooth spaces of the base shaft.

* * * * *